United States Patent [19]

Takeoka

[11] Patent Number: 5,405,888
[45] Date of Patent: Apr. 11, 1995

[54] CURABLE SILICONE COMPOSITION

[75] Inventor: Toru Takeoka, Cincinnati, Ohio

[73] Assignee: Three Bond Co, Ltd., Tokyo, Japan

[21] Appl. No.: 174,127

[22] Filed: Dec. 28, 1993

[51] Int. Cl.$^6$ .............................................. C08F 2/46
[52] U.S. Cl. ..................................... 522/34; 524/266;
524/268; 524/369; 524/378; 524/588; 528/26;
528/28; 528/32; 528/38
[58] Field of Search ............... 524/266, 268, 369, 378,
524/588; 528/26, 28, 38, 32; 522/34

[56] References Cited

U.S. PATENT DOCUMENTS

| | | | |
|---|---|---|---|
| 4,528,081 | 7/1985 | Lien et al. | 528/12 |
| 4,675,346 | 6/1987 | Lin et al. | 522/39 |
| 4,766,185 | 8/1988 | Ryntz et al. | 528/28 |
| 5,091,483 | 2/1992 | Mazurek et al. | 528/26 |

Primary Examiner—John C. Bleutge
Assistant Examiner—Mark D. Sweet
Attorney, Agent, or Firm—Scully, Scott, Murphy & Presser

[57] ABSTRACT

A photocurable and moisture-curable silione composition comprising a reactive organosilane which has acryldialkoxysilyl or acryldiallyloxysilyl groups at both ends, a silicone oil, a photosensitizer and a moisture-curing catalyst.

3 Claims, No Drawings

CURABLE SILICONE COMPOSITION

BACKGROUND OF THE INVENTION

The present invention relates to a curable silicone composition which cures elastomerically upon radiation of an ultraviolet light (hereinafter referred to as "UV") thereto and which, in a shaded place not getting the sun, can undergo a curing reaction induced by moisture.

Heretofore, curable silicone compositions have been used in various industrial fields because of their superior characteristics. However, many of them are a heat-curing type, a room temperature curing type requiring standing for a long time, or a two-pack type. Thus, there has been problem in point of their curing time and working efficiency. Photocuring type silicones have been developed for solving such problem, but in the photocuring type silicone compositions known at present, the reaction induced by the radiation of light does not always proceed at a sufficiently high speed, and there can be obtained only relatively thin cured products. Further, the photocuring silicones proposed in Japanese Patent Publication Nos. 215009/1985, 127718/1986 and 112262/1980 require complicated steps such as heating and pressure reducing steps in their manufacturing process, and thus a simple method for obtaining such compositions has been desired.

It is an object of the present invention to solve the above-mentioned problems of the prior art.

It is another object of the present invention to provide a silicone resin composition which is cured by either its photocurability or moisture-curability.

It is a further object of the present invention to provide a photocurable and moisture-curable silicone resin composition easy to manufacture, exhibiting a suitable curing speed and capable of affording a cured product which possesses excellent physical properties.

Further objects of the present invention will become apparent from the following description.

SUMMARY OF THE INVENTION

The present invention resides in a composition capable of being cured by both moisture-curing and UV-curing mechanisms and comprising:

(a) 30-100 parts by weight of a reactive organosiloxane containing 0.1-5 wt % of a moisture-curing Catalyst for silicone, the said reactive organosiloxane being an addition reaction product of a silicone and an acrylic acid derivative, the said silicone being represented by the following formula (I) and having a kinematic viscosity of 50 to 50,000 centistokes measured at 25° C. and also having amino groups at both ends thereof:

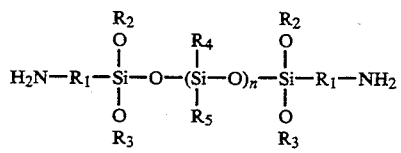

where $R_1$ to $R_5$, which are the same or different, are each an organic group, and n is a an integer of 2 or more, the said acrylic acid derivative being represented by the following formula (II):

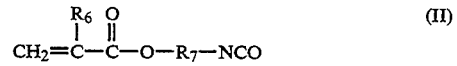

where $R_6$ is hydrogen or an alkyl group having 1 to 5 carbon atoms and $R_7$ is an alkylene group;

(b) 0-70 parts by weight of a silicone oil having trimethylsilyl group as an end group;
(c) an effective amount of a photosensitizer; and
(d) a moisture-curing catalyst.

DETAILED DESCRIPTION OF THE INVENTION

The component (a) as a constituent of the composition of the present invention comprises a reactive organosiloxane obtained by an addition reaction of the amino groups of the silicone of the above formula (I) having the amino groups at both ends thereof with the isocyanate group of the acrylic acid derivative of the above formula (II), and 0.1-5 wt %, based on the weight of the said reactive organosiloxane, of a moisture-curing catalyst for silicone.

In the formula (I), $R_1$ to $R_5$ are each an organic group. Although the kind thereof is not specially limited, examples of $R_1$ include alkylene groups (preferably having 1 to 6 carbon atoms) such as methylene, ethylene and propylene, and arylene groups (preferably having 6 to 8 carbon atoms) such as phenylene. $R_2$ and $R_3$ are each an alkyl group having 1 to 2 carbon atoms or allyl. Examples of $R_4$ and $R_5$ include alkyl groups (preferably having 1 to 6 carbon atoms) such as methyl, ethyl, propyl and butyl, alkenyl groups (preferably having 2 to 6 carbon atoms) such as vinyl and allyl, aryl groups (preferably having 6 to 8 carbon atoms) such as phenyl, and groups obtained by substituting hydrogen atoms of those exemplified groups partially with a halogen atom for example. Further, in the formula (I), n is an integer of 2 or more sufficient for the silicone of formula (I) to exhibit a kinematic viscosity of 50 to 50,000 centistokes measured at 25° C.

The following is one concrete example of the silicone in question:

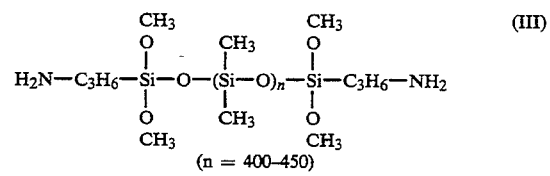

wherein $R_6$ is preferably hydrogen or methyl and $R_7$ is preferably an alkylene group having 1 to 6 carbon atoms.

As a concrete example of the acrylic acid derivative, there is mentioned:

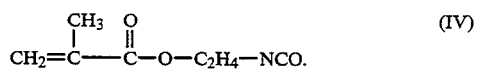

When the components (I) and (II) are mixed together at proportions of 1 mole of (I) and at least 2 moles of (II) at an ambient temperature, under stirring, for about 6 to 24 hours, the amino and isocyanate groups undergo an addition reaction to afford a reactive organosiloxane. The reactive organosiloxane can be represented by the following formula:

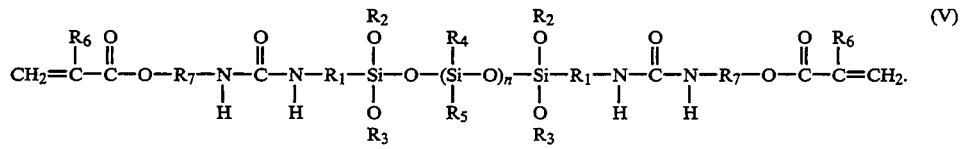

The silicone oil used as component (b) in the present invention is a polydimethylsiloxane having a kinematic viscosity of 50 to 5,000 centistokes measured at 25° C. and having trimethylsilyl group as an end 9 Group. This oil can be used at a proportion of 0 to 20 parts by weight relative to 100 parts by weight of the silicone composition, as a diluent for improving the handleability of the curing composition or for adjusting the softness of cured product.

As to the sensitizer used in the present invention, no special limitation is placed thereon if only it is a photosensitizer which has been known heretofore. As examples there are mentioned benzoin and derivatives thereof, benzoin ethers such as benzoin alkyl ethers, benzyl and derivatives thereof, aromatic diazonium salts, anthraquinone and derivatives thereof, acetophenone and derivatives thereof, sulfur compounds such as diphenyl disulfide, benzophenone and derivatives thereof. These compounds may be used each alone or as a mixture of two or more thereof.

The moisture-curing catalyst used in the present invention is not specially limited if only it is a room temperature curing type moisture-curing catalyst for silicone which catalyst does not produce a reverse effect on acryl group, for example, does not induce curing of acryl group or obstruct it. The proportion thereof may be in the range of 0.1% to 5% relative to the reactive polyorganosiloxane. As examples of tin compounds employable for this moisture-curing catalyst there are mentioned dibutyltin dilaurate, dibutyltin diacetate, dibutyltin dimethoxide, carbomethoxyphenyltin trisuverate, stannous octoate, isobutyltin tricelloate, dimethyltin dibutyrate, dimethyltindineodeconoate, triethyltin tartrate, dibutyltin dibenzoate, tin oleate, tin naphthenate, butyltin tri-2-ethylhexoate, and tin acetate. As examples of employable titanium compounds there are mentioned 1,3-propanedioxytitanium bis(ethylacetoacetato), 1,3-propanedioxytitanium bis-(acetylacetonato), diisopropoxytitanium bis-(acetylacetonato), tetra-2-ethylhexyl titanate, and tetraphenyl titanate. Further examples include zirconium octanoate as a zirconium compound, lead 2ethyloctanoate as a lead compound, iron 2-ethylhexanoate as an iron compound, as well as cobalt 2-ethylhexanoate, manganese 2-ethylhexanoate, zinc 2-ethylhexanoate, antimony octanoate, bismuth naphthenate, zinc naphthenate, and zinc stearate. As examples of non-metallic catalysts employable in the invention there are mentioned hexylammonium acetate and benzyltrimethylammonium acetate.

In the composition of the present invention there may be incorporated various fillers and pigments where required, such as, for example, titanium dioxide, zirconium silicate, silica aerosil, iron oxide, diatomaceous earth, fumed silica, carbon black. precipitated silica, glass fiber, polyvinyl chloride, ground quartz, and calcium carbonate. The amount of fillers to be used is adjusted in a wide range according to the purpose of use.

Other additives, for example, various known chemicals, including bonding aids and stabilizers, may also be incorporated in the composition of the present invention if necessary.

The composition of the present invention possesses both the feature of curing rapidly upon radiation of UV thereto and the feature of curing to a satisfactory extent by the effect of condensation catalyst in a shaded place not getting the sun.

EXAMPLE-1

An organopolysiloxane (EXP34, a product of GENESEE POLYMERS CO.) of the formula (I) with $R_1$ being propylene, $R_2$ and $R_3$ being methyl and $R_4$ and $R_5$ methyl, having amino groups at both ends thereof and having a viscosity of 4,000 centistokes, was fed into a 200 g flask, into which was then added 4.2 g of 2-isocyanatoethyl methacrylate (MOI, a product of Nippon Rodea Chem. Co.). Stirring was made at an ambient temperature in a nitrogen gas atmosphere for 12 hours and reaction was allowed to proceed. (The reaction solution was initially transparent, but after completion of the reaction its color changed to milk-white.) The viscosity of the reaction product was 6,000 centipoise. Next, 20 g of dimethylsilicone oil having a viscosity of 100 centistokes, 0.1 g of titanium isopropoxide as a condensation catalyst and 3 g of diethoxyacetophenone as a photosensitizer were added, followed by stirring for mixing.

EXAMPLE-2

The procedure of Example-1 was repeated, provided the amino group terminated silicone described in Example-1 was replaced with a like silicone (GP-145, a product of GENESEE POLYMERS CO.) having a viscosity of 1,500 centistokes and the amount of the 2isocyanatoethyl methacrylate was changed to 3.5 g, to afford a reaction product having a viscosity of 2,500 stokes. Next, 20 g of dimethylsilicone oil having a viscosity of 100 centistokes, 0.1 g of titanium isopropoxide as a condensation catalyst and 3 g of diethoxyacetophenone as a photosensitizer were added, followed by stirring for mixing.

EXAMPLE-3

5 g of Aerosil R-972 (a product of Degussa Inc.) as a filler was added to 100 g of the composition prepared in Example-2.

Run-1

The compositions obtained in Examples 1 to 3 were irradiated using a high pressure mercury vapor lamp of 100 mw/cm² for 30 seconds and were allowed to stand at room temperature for 24 hours. Thereafter physical properties of the compositions were measured. The results are as shown in table below.

|  | Example-1 | Example-2 | Example-3 |
|---|---|---|---|
| UV Curability | Good | Good | Good |
| Hardness | 10 | 10 | 20 |

-continued

|  | Example-1 | Example-2 | Example-3 |
|---|---|---|---|
| Elongation, % | 120 | 100 | 120 |
| Tensile Strength, Kg/cm$_2$ | 3.0 | 2.0 | 5.2 |

What is claimed is:

1. A silicone composition capable of being cured by both moisture-curing and UV-curing mechanisms comprising:

(a) 30–100 parts by weight of a reactive organosiloxane containing 0.1–5 wt % of a moisture-curing catalyst for silicone, said reactive organosiloxane being an addition reaction product of a silicone and an acrylic acid derivative, said silicone having a kinematic viscosity or 50 to 50,000 centistokes, measured at 25° C., said silicone having the structural formula $$H_2N-R_1-\underset{\underset{R_3}{|}}{\overset{\overset{R_2}{|}}{\underset{|}{Si}}}-O-(\underset{\underset{R_5}{|}}{\overset{\overset{R_4}{|}}{Si}}-O)_n-\underset{\underset{R_3}{|}}{\overset{\overset{R_2}{|}}{\underset{|}{Si}}}-R_1-NH_2$$

where $R_1$ and $R_5$, which are the same of different, are each an organic group, and n is an integer of at least 2, said acrylic acid derivative having the formula $$CH_2=\underset{\underset{}{|}}{\overset{\overset{R_6}{|}}{C}}-\overset{\overset{O}{\|}}{C}-O-R_7-NCO$$

where $R_6$ is hydrogen or an alkyl group having 1 to 5 carbon atoms and $R_7$ is an alkylene group;

(b) 0–70 parts by weight of a silicone oil per 100 parts by weight of the silicone composition, said silicone oil having a trimethylsilyl group as an end group; and (c) an effective amount of a photosensitizer.

2. The silicone composition as set forth in claim 1 wherein said reactive organosilane is obtained by condensing-reacting at least two mole of said acrylic acid derivative to 1 mole of said silicone.

3. The silicone composition as set forth in claim 1 wherein said silicone oil of component (b) is a polymethylsiloxane having a kinematic viscosity of 50 to 5,000 centistokes measured at 251° C.

* * * * *

UNITED STATES PATENT AND TRADEMARK OFFICE
CERTIFICATE OF CORRECTION

PATENT NO.  : 5,405,888
DATED       : April 11, 1995
INVENTOR(S) : Toru Takeoka

It is certified that error appears in the above-indentified patent and that said Letters Patent is hereby corrected as shown below:

Column 1, line 50: "Catalyst" should read --catalyst--

Column 3, line 11: delete "9"

Column 3, line 12: "20' should read --70--

Column 3, lines 49-50: "2ethyloctanoate" should read --2-ethyloctanoate--

Column 3, line 62: "black." should read --black,--

Column 4, line 44: "2isocyanatoethyl" should read --2-isocyanatoethyl--

Column 6, line 34, Claim 3: "251° C." should read --25° C.--

Signed and Sealed this

Thirteenth Day of February, 1996

Attest:

BRUCE LEHMAN

Attesting Officer        Commissioner of Patents and Trademarks